(12) United States Patent
Kwon et al.

(10) Patent No.: US 9,995,959 B2
(45) Date of Patent: Jun. 12, 2018

(54) DISPLAY APPARATUS

(71) Applicant: Samsung Display Co., Ltd., Yongin, Gyeonggi-Do (KR)

(72) Inventors: Jaejoong Kwon, Yongin (KR); Hyesog Lee, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 312 days.

(21) Appl. No.: 14/677,830

(22) Filed: Apr. 2, 2015

(65) Prior Publication Data

US 2016/0139461 A1    May 19, 2016

(30) Foreign Application Priority Data

Nov. 18, 2014    (KR) .................. 10-2014-0160875

(51) Int. Cl.
  *G02F 1/23*   (2006.01)
  *G02F 1/1335*   (2006.01)
  (Continued)

(52) U.S. Cl.
  CPC ..... *G02F 1/133528* (2013.01); *G02B 5/3058* (2013.01); *G02B 5/3083* (2013.01);
  (Continued)

(58) Field of Classification Search
  CPC ............. G02F 2413/02; G02F 1/13363; G02F 2001/133638; G02F 1/133528; G02F 2001/133541; G02F 2001/133565; G02F 2203/02; G02F 2203/62; G02F 1/23; G02F 3/022; G02F 2413/03; G02F 2413/07; G02F 1/1335; G02F 1/133553; G02F 1/134309; G02F 2001/133538; G02F 2001/133562; G02F 2001/133626; G04C 3/002;
  (Continued)

(56) References Cited

U.S. PATENT DOCUMENTS 5,283,600 A * 2/1994 Imai ..................... G02B 27/283
  348/E9.027
6,829,071 B2 * 12/2004 Allen ................... G02B 5/0236
  349/64

(Continued)

FOREIGN PATENT DOCUMENTS

| JP | 2000-105352 A | 4/2000 |
| JP | 2010-113114 A | 5/2010 |
| KR | 10-2008-086110 A | 9/2008 |

*Primary Examiner* — Bumsuk Won
*Assistant Examiner* — Balram Parbadia
(74) *Attorney, Agent, or Firm* — Knobbe Martens Olson & Bear LLP

(57) ABSTRACT

A display apparatus comprises a display panel and a reflection member. The display panel comprises an array of pixels, the array having a quadrangular shape. The reflection member is disposed in a position not to overlap at least a portion of the array when viewed in a normal direction substantially perpendicular to a major surface of the display panel, the reflection member being configured to reflect light that is emitted from the display panel in a direction slanted with respect to the normal direction. The combination of light emitted from the display panel in the normal direction and the reflected light is configured to form an image having a shape other than a quadrangular shape.

23 Claims, 9 Drawing Sheets

(51) Int. Cl.
*G02B 5/30* (2006.01)
*G02F 1/13363* (2006.01)

(52) U.S. Cl.
CPC .... *G02F 1/133553* (2013.01); *G02F 1/13363* (2013.01); *G02F 2001/133538* (2013.01); *G02F 2001/133562* (2013.01); *G02F 2413/02* (2013.01)

(58) Field of Classification Search
CPC ......... G06F 1/163; G06F 3/014; G03B 21/10; G03B 21/28; G02B 27/26; G02B 26/06; G02B 5/3083; G02B 6/278
See application file for complete search history.

(56) References Cited

U.S. PATENT DOCUMENTS

| | | | |
|---|---|---|---|
| 2006/0268185 A1* | 11/2006 | Hamagishi | G02B 27/2242 349/15 |
| 2007/0024780 A1* | 2/2007 | Kim | G02F 1/133634 349/117 |
| 2008/0013018 A1* | 1/2008 | Jang | G02F 1/133555 349/102 |
| 2008/0158641 A1* | 7/2008 | Lieb | G02B 6/0046 359/263 |
| 2008/0231952 A1 | 9/2008 | Kim | |
| 2008/0259232 A1* | 10/2008 | Kim | G02F 1/133528 349/15 |
| 2010/0110394 A1 | 5/2010 | Murakami | |
| 2012/0026305 A1* | 2/2012 | Kim | G02B 5/3083 348/58 |
| 2014/0139422 A1 | 5/2014 | Mistry et al. | |

\* cited by examiner (a)   (b)   (c)

(a)    (b)    (c)

DISPLAY APPARATUS

RELATED APPLICATION

This application claims the benefit of Korean Patent Application No. 10-2014-0160875, filed on Nov. 18, 2014, in the Korean Intellectual Property Office, the disclosure of which is incorporated herein in its entirety by reference.

BACKGROUND

1. Field

One or more embodiments relate to a display apparatus, and more particularly, to a pseudo-free form display apparatus having an actual shape and a visually perceived shape that are different from each other.

2. Description of the Related Art

Recently, demands for free form display apparatuses having various shapes other than quadrangular shapes have increased. For example, research has been conducted on display apparatuses having various shapes in consideration of functional and aesthetic factors to, for example, apply circular display apparatuses to smart watches, vehicle dashboards, etc.

However, manufacturing costs of free form display apparatuses are higher than those of display apparatuses having quadrangular shapes.

SUMMARY

One or more embodiments include a pseudo-free form display apparatus having an actual shape that is relatively easily manufactured and a visually perceived shape that are different from each other.

Additional aspects will be set forth in part in the description which follows and, in part, will be apparent from the description or may be learned by practice of the presented embodiments.

One aspect of the invention provides a display apparatus comprising: a display panel comprising a major surface, the display panel comprising an array of pixels; a first polarization member that is disposed over the display panel and configured to separate light emitted from the display panel into first polarized light and second polarized light that are respectively polarized in a first direction and a second direction that are substantially perpendicular to each other; a second polarization member that is disposed over the first polarization member such that the first polarization member is disposed between the display panel and the second polarization member, the second polarization member being configured to allow light polarized in the first direction to transmit therethrough and inhibit light polarized in the second direction from transmitting therethrough; a reflection member that is disposed in a position not to overlap at least a portion of the array when viewed in a normal direction substantially perpendicular to the major surface, the reflection member being configured to reflect light emitted from the display panel in a direction slanted with respect to the normal direction and transmitted through the first polarization member toward the second polarization member; a first phase retarder that is disposed in a path of light that is emitted from the display panel and transmitted through the first polarization member toward the reflection member; and a second phase retarder that is disposed in a path of light that is reflected by the reflection member and transmitted toward the second polarization member.

In the foregoing apparatus, the display panel may have a substantially quadrangular shape. Each of the first phase retarder and the second phase retarder may be a quarter wave plate, wherein there is an angle of about 45° between a slow axis of the first phase retarder and an axis of polarization of the first polarization member, wherein there is an angle of about 90° between a slow axis of the second phase retarder and the slow axis of the first phase retarder.

Still in the foregoing apparatus, the first polarization member may comprise a plurality of first areas configured to transmit therethrough only a component of the first direction of light emitted from the display panel and a plurality of second areas configured to transmit therethrough only a component of the second direction of the light emitted from the display panel. The plurality of first areas and the plurality of second areas may be arranged in a checkerboard pattern. The plurality of first areas being stripe-shaped and the plurality of second areas being stripe-shaped may be alternately arranged. The first polarization member may be configured to switch between transmitting therethrough only a component of the first direction of the light emitted from the display panel and transmitting therethrough only a component of the second direction of the light emitted from the display panel according to an electrical signal. An angle between a light-emission surface of the display panel and a reflective surface of the reflection member may be equal to or greater than about 90°. An angle between the light-emission surface of the display panel and the reflective surface of the reflection member may be adjustable. The reflection member may surround the display panel when viewed in the normal direction and be disposed not to reflect light that is emitted from the display panel in the normal direction, wherein the first and second retarders are disposed such that the light emitted from the display panel does not pass therethrough.

Another aspect of the invention provides a display apparatus comprising: a display panel comprising an array of pixels, the array having a quadrangular shape; and a reflection member that is disposed in a position not to overlap at least a portion of the array when viewed in a normal direction perpendicular to a major surface of the display panel, the reflection member being configured to reflect light that is emitted from the display panel in a direction slanted with respect to the normal direction, wherein the combination of light emitted from the display panel in the normal direction and the reflected light is configured to form an image having a shape other than a quadrangular shape.

In the foregoing apparatus, the apparatus may further comprise: a first polarization member that is disposed over the display panel and configured to separate light emitted from the display panel into first polarized light and second polarized light that are respectively polarized in a first direction and a second direction that are substantially perpendicular to each other; a second polarization member that is disposed over the first polarization member such that the first polarization member is disposed between the display panel and the second polarization member, the second polarization member being configured to allow light polarized in the first direction to transmit therethrough and inhibit light polarized in the second direction from transmitting therethrough; a first phase retarder that is disposed between the first polarization member and the second polarization member; and a second phase retarder that is disposed between the first phase retarder and the second polarization member. Each of the first phase retarder and the second phase retarder may be a quarter wave plate, wherein there is an angle of about 45° between a slow axis of the first phase retarder and an axis of polarization of the first polarization member, wherein there is an angle of about 90° between a slow axis of the second phase retarder and the slow axis of the first phase retarder.

Still in the foregoing apparatus, the first polarization member comprises a plurality of first areas configured to transmit therethrough only a component of the first direction of light emitted from the display panel and a plurality of second areas configured to transmit therethrough only a component of the second direction of the light that is emitted from the display panel. The plurality of first areas and the plurality of second areas may be arranged in a checkerboard pattern. The plurality of first areas being stripe-shaped and the plurality of second areas being stripe-shaped may be alternately arranged. The first polarization member may be configured to switch between transmitting therethrough only a component of the first direction of the light emitted from the display panel and transmitting therethrough only a component of the second direction from among the light that is emitted from the display panel according to an electrical signal.

Further in the foregoing apparatus, an angle between a light-emission surface of the display panel and a reflective surface of the reflection member may be equal to or greater than about 90°. An angle between the light-emission surface of the display panel and the reflective surface of the reflection member is adjustable. The reflection member may surround the display panel when viewed in the normal direction and may be disposed not to reflect light that is emitted from the display panel in the normal direction.

According to one or more embodiments, a display apparatus includes: a display panel; a first polarization member that is disposed in front of the display panel, and spatially or temporally separates light emitted from the display panel into first light and second light that are respectively polarized in a first direction and a second direction that are substantially perpendicular to each other; a second polarization member that is disposed in paths of the first light and the second light that pass through the first polarization member, and transmits therethrough only light that is polarized in the first direction; a reflection member that is disposed in a path of light that is emitted at an angle that is greater than a predetermined value in a normal direction of the display panel from the display panel, and reflects light that is incident from the display panel to the second polarization member; a first phase retarder that is disposed in a path of light that is emitted from the display panel and is incident on the reflection member; and a second phase retarder that is disposed in a path of light that is reflected by the reflection member and is incident on the second polarization member.

The display panel may have a substantially quadrangular shape.

Each of the first phase retarder and the second phase retarder may be a quarter wave plate, there may be an angle of about 45° between a slow axis of the first phase retarder and an axis of polarization of the first polarization member, and there may be an angle of about 90° between a slow axis of the second phase retarder and the slow axis of the first phase retarder.

The first polarization member may include a first area that transmits therethrough only a component of the first direction and a second area that transmits therethrough only a component of the second direction from among the light emitted from the display panel.

The first area and the second area may be arranged in a checkerboard pattern.

The first area and the second area may be alternately arranged in a striped pattern.

The first polarization member may have a switching function of transmitting therethrough only a component of the first direction or transmitting therethrough only a component of the second direction from among the light emitted from the display panel according to an electrical signal.

An angle between a light-emission surface of the display panel and a reflective surface of the reflection member may be equal to or greater than about 90°.

The angle between the light-emission surface of the display panel and the reflective surface of the reflection member may be adjustable.

The reflection member may be disposed outside a path of light that is emitted in the normal direction of the display panel.

According to one or more embodiments, a display apparatus includes: a display panel having a quadrangular shape; and a reflection member that is disposed in a path of light that is emitted at an angle that is greater than a predetermined value in a normal direction of the display panel from the display panel, and reflects light that is incident from the display panel, wherein it looks to a user as if an image formed from the display panel has a shape other than the quadrangular shape.

The display apparatus may further include: a first polarization member that is disposed in front of the display panel, and spatially or temporally separates light emitted from the display panel into first light and second light that are respectively polarized in a first direction and a second direction that are substantially perpendicular to each other; a second polarization member that is disposed in paths of the first light and the second light that pass through the first polarization member, and transmits therethrough only light that is polarized in the first direction; a first phase retarder that is disposed in a path of light that is emitted from the display panel and is incident on the reflection member; and a second phase retarder that is disposed in a path of light that is reflected by the reflection member and is incident on the second polarization member.

Each of the first phase retarder and the second phase retarder may be a quarter wave plate, there may be an angle of about 45° between a slow axis of the first phase retarder and an axis of polarization of the first polarization member, and there may be an angle of about 90° between a slow axis of the second phase retarder and the slow axis of the first phase retarder.

The first polarization member may include a first area that transmits therethrough only a component of the first direction and a second area that transmits therethrough only a component of the second direction from among the light that is emitted from the display panel.

The first area and the second area may be arranged in a checkerboard pattern.

The first area and the second area may be alternately arranged in a striped pattern.

The first polarization member may have a switching function of transmitting therethrough only a component of the first direction or transmitting therethrough only a component of the second direction from among the light emitted from the display panel according to an electrical signal.

An angle between a light-emission surface of the display panel and a reflective surface of the reflection member may be equal to or greater than about 90°.

The angle between the light-emission surface of the display panel and the reflective surface of the reflection member may be adjustable.

The reflection member may be disposed outside a path of light that is emitted in the normal direction of the display panel.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
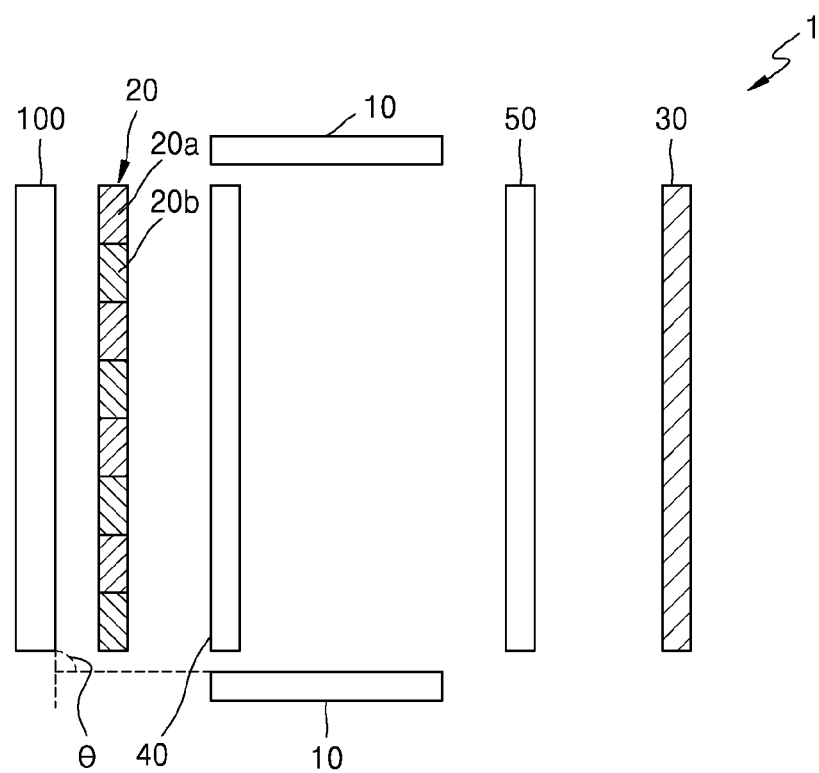
FIG. 1 is a view illustrating a display apparatus according to an embodiment.

The inventive concept may include various embodiments and modifications, and embodiments thereof will be illustrated in the drawings and will be described herein in detail. The advantages and features of the inventive concept and methods of achieving the advantages and features will be described more fully with reference to the accompanying drawings, in which embodiments of the inventive concept are shown. The inventive concept may, however, be embodied in many different forms and should not be construed as being limited to the embodiments set forth herein;

Reference will now be made in detail to embodiments, examples of which are illustrated in the accompanying drawings, wherein like reference elements are denoted by like elements and a repeated explanation thereof will not be given.

While such terms as "first", "second", etc., may be used to describe various components, such components must not be limited to the above terms. The above terms are used only to distinguish one component from another.

As used herein, the singular forms "a", "an", and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. For example, intervening layers, regions, or components may be present.

Sizes of components in the drawings may be exaggerated for convenience of explanation. In other words, since sizes and thicknesses of components in the drawings are arbitrarily illustrated for convenience of explanation, the following embodiments are not limited thereto.

As used herein, the term "and/or" includes any and all combinations of one or more of the associated listed items.

Figure 2A:
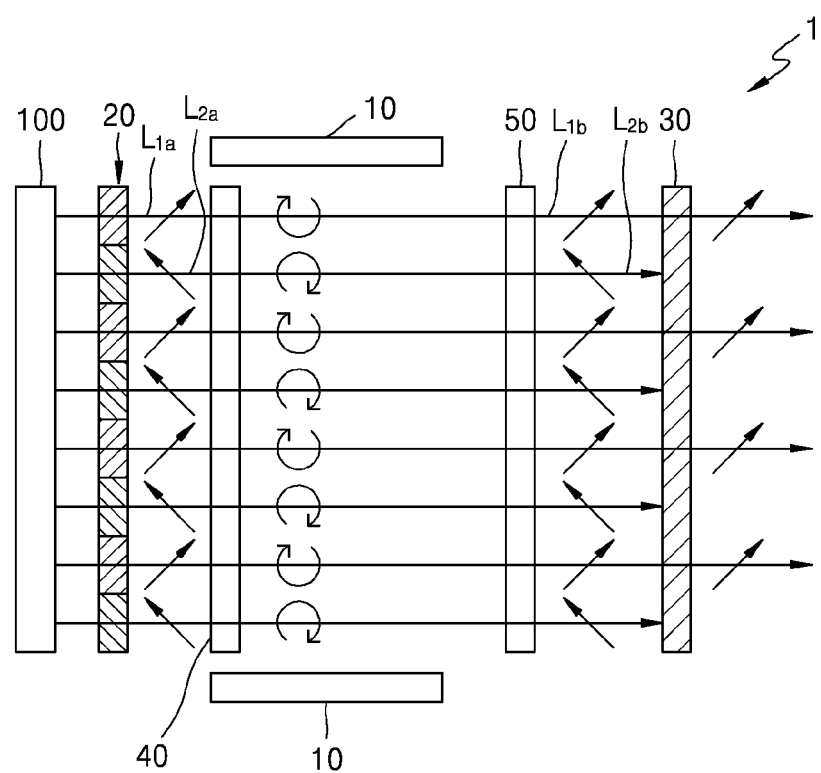
FIG. 2A is a view illustrating a path of light emitted in a normal direction from the display apparatus of FIG. 1, according to an embodiment.
Figure 2B:
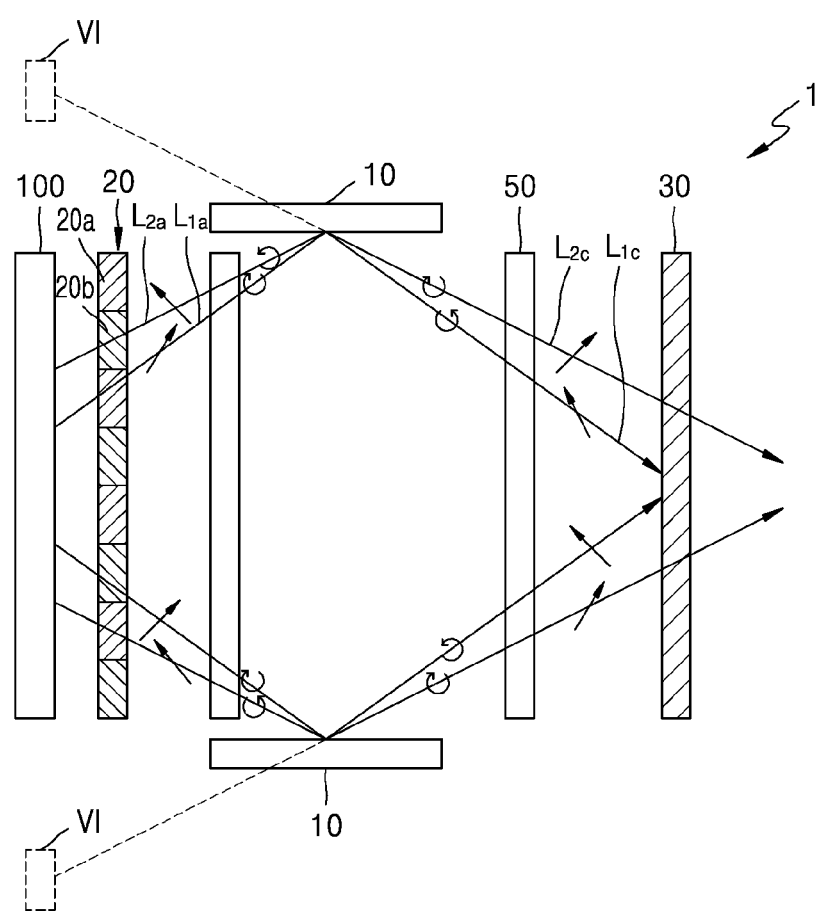
FIG. 2B is a view illustrating a path of light emitted in a direction with an angle that is greater than a predetermined value with respect to the normal direction from the display apparatus of FIG. 1, according to an embodiment.

FIG. 1 is a view illustrating a display apparatus 1 according to an embodiment. FIG. 2A is a view illustrating a path of light emitted in a normal direction from the display apparatus 1 of FIG. 1, according to an embodiment. FIG. 2B is a view illustrating a path of light emitted in a direction slanted with respect to the normal direction from the display apparatus 1 of FIG. 1, according to an embodiment.

Referring to FIGS. 1, 2A, and 2B, the display apparatus 1 according to an embodiment includes a display panel 100, a first polarization member 20, a second polarization member 30, and a reflect member 10. The first polarization member or plate 20 is disposed in front of the display panel 100 and separates light emitted from the display panel 100 into first light $L_{1a}$ and second light $L_{2a}$ that are respectively polarized in a first direction and a second direction that are substantially perpendicular to each other. The second polarization member or plate 30 is disposed in paths of the first light $L_{1a}$ and second light $L_{2a}$ that pass through the first polarization member 20 and transmits therethrough light that is polarized in the first direction. The reflection member or mirror 10 is disposed in a path of light emitted in a direction slanted with respect to a normal direction from the display panel 100 and reflects light that is incident from the display panel 100 to the second polarization member 30. In embodiments, the normal direction is substantially perpendicular to a major surface of the display panel. The major surface may be a surface of a substrate in the display panel. In another embodiment, the major surface may be a display surface of the display panel. In the illustrated embodiments, the slanted direction has an angle with respect to the normal direction may be greater than a predetermined angle which is greater than 0°. In an embodiment, the reflection member may reflect light beams emitted from the display panel which form an angle greater than 0° and smaller than 90°. In another embodiment, the reflection member may reflect light beams emitted from the display panel which form an angle greater than 0° and smaller than 45°.

In the illustrated embodiments, the apparatus further includes a first phase retarder 40 that is disposed in a path of light that is emitted from the display panel 100 and is incident on the reflection member 10, and a second phase retarder 50 that is disposed in a path of light that is reflected by the reflection member 10 and is incident on the second polarization member 30. The first and second polarization members and the first and second phase retarders may form a multi-layered optical structure. In embodiments, the reflector 10 may include a reflection surface generally facing the multi-layered optical structure.

The display panel 100 may be any of various types of panels that display images, such as an organic light-emitting display panel, a liquid crystal display (LCD) panel, a plasma display panel, or an electrophoresis display panel, and may have a substantially quadrangular shape.

Display panels having quadrangular shapes have been widely applied to mobile phones, tablet computers, monitors, TVs, etc, and thus, are familiar to users, and may be economical in consideration of productivity and yield.

The first polarization member 20 may be disposed in front of the display panel 100, wherein the first polarization member 20 includes first areas 20a and second areas 20b. The first areas 20a and the second areas 20b may include polarizers that are oriented in different directions, and light beams transmitted through the first areas 20a may be polarized in the first direction and light beams transmitted through the second areas 20b may be polarized in the second direction that is substantially perpendicular to the first direction.

The first areas 20a may transmit therethrough only components of the first direction and may block light of other directions from among light emitted from the display panel 100. The second areas 20b may transmit therethrough only components of the second direction and may block light of other directions from among light emitted from the display panel 100.

The first areas 20a and the second areas 20b of the first polarization member 20 may be arranged in various patterns. For example, the first areas 20a and the second areas 20b may be arranged in a checkerboard pattern or a striped pattern, but the inventive concept is not limited thereto. Since a shape of an image visually perceived by a user may vary according to an arrangement of the first areas 20a and the second areas 20b of the first polarization member 20, the arrangement of the first areas 20a and the second areas 20b may be changed according to a desired shape, which will be explained below.

The first phase retarder 40 may be disposed between the first polarization member 20 and the second polarization member 30. The first phase retarder 40 may be a quarter wave plate, and there may be an angle of about 45° between a slow axis of the first phase retarder 40 and an axis of polarization of the first polarization member 20. In embodiments, axes of polarization of the first areas 20a and the second areas 20b having axes of polarization that are perpendicular to each other may form an angle of about 45° with the slow axis of the first phase retarder 40, respectively.

Accordingly, light transmitted through the first polarization member 20 may be changed into circularly polarized light by the first phase retarder 40. In this case, the first light $L_{1a}$ and the second light $L_{2a}$ may be changed into circularly polarized light of different directions. For example, the first light $L_{1a}$ may be changed into clockwise circularly polarized light and the second light $L_{2a}$ may be changed into counterclockwise circularly polarized light.

Although the display panel 100, the first polarization member 20, and the first phase retarder 40 are spaced apart from one another by a predetermined interval in FIG. 1 for convenience of explanation, the first polarization member 20 and the first phase retarder 40 may be attached to the display panel 100 with or without an adhesive material. In embodiment, the first polarization member 20 may contact the display panel and the first phase retarder 40 may contact the first polarization member 20. In the illustrated embodiments, the second phase retarder 40 and the second polarization member 30 may be spaced from each other. In other embodiments, the second phase retarder 40 and the second polarization member 30 may be attached to each other with or without an adhesive. In illustrated embodiments, the first phase retarder and the second phase retarder may be spaced from each other.

Referring to FIG. 2A, light emitted in the normal direction from the display panel 100 may pass through the first polarization member 20 and the first phase retarder 40, and then may be incident on the second phase retarder 50 located between the first phase retarder 40 and the second polarization member 30.

The second phase retarder 50 may be a quarter wave plate, and there may be an angle of about 90° between a slow axis of the second phase retarder 50 and the slow axis of the first phase retarder 40. Accordingly, light passing through the first phase retarder 40 and the second phase retarder 50 may be linearly polarized light of the same direction as that of light before passing through the first phase retarder 40.

In embodiments, the first light $L_{1a}$ and second light $L_{2a}$ that are respectively polarized in the first direction and the second direction may be circularly polarized by the first phase retarder 40 and the second phase retarder 50, and then may be changed back into third light $L_{1b}$ and fourth light $L_{2b}$ that are respectively polarized in the first direction and the second direction.

The third light $L_{1b}$ and fourth light $L_{2b}$ that are respectively polarized in the first direction and the second direction may be incident on the second polarization member 30 that is disposed in front of the second polarization member 50. The second polarization member 30 may transmit therethrough only light that is polarized in the first direction, and thus, may transmit only the third light $L_{1b}$ that is polarized in the first direction. In embodiments, a user who is in front of the second polarization member 30 may visually perceive only the third light $L_{1b}$ that originates from the first light $L_{1a}$ from among the light emitted substantially in the normal direction from the display panel 100.

Although the first phase retarder 40 and the second phase retarder 50 are located so that light emitted in the normal direction from the display panel 100 passes through the first phase retarder 40 and the second phase retarder 50 in FIG. 1, the inventive concept is not limited thereto. In embodiments, the first phase retarder 40 and the second phase retarder 50 may be located only in a path of light that is incident on and is reflected by the reflection member 10.

Referring to FIG. 2B, light emitted from the display panel 100 in a slanted direction with an angle that is greater than a predetermined value with respect to the normal direction may pass through the first polarization member 20 and the first phase retarder 40, and then may be reflected by the reflection member 10. Light reflected by the reflection member 10 may be incident on the second phase retarder 50. An angle θ between a light-emission surface of the display panel 100 and a reflective surface of the reflection member 10 may be equal to or greater than about 90°. Since the angle θ is equal to or greater than about 90°, light reflected by the reflection member 10 may be efficiently guided to the second polarization member 30.

Since the reflection member 10 has to be disposed to reflect only light emitted in a direction having an angle greater than the predetermined value with respect to the normal direction from the display panel 100, the reflection member 10 may be disposed outside a path of light emitted in the normal direction from the display panel 100. In embodiments, the light emitted in the normal direction from the display panel 100 may be directly incident on the second phase retarder 50 without being reflected by the reflection member 10.

The first light $L_{1a}$ and second light $L_{2a}$ that pass through the first phase retarder 40 are respectively circularly polarized in a clockwise direction and a counterclockwise direction, may be reflected by the reflection member 10 to change their phases by 180°, and thus may be respectively circularly polarized in the counterclockwise direction and the clockwise direction.

The lights respectively circularly polarized in the counterclockwise direction and the clockwise direction may be changed by the second phase retarder 50 into fifth light $L_{1c}$ and sixth light $L_{2c}$ that are respectively linearly polarized in the second direction and the first direction. The first light $L_{1a}$ that is polarized in the first direction may be changed into the fifth light $L_{1c}$ that is polarized in the second direction by the second phase retarder 50, and the second light $L_{2a}$ that is polarized in the second direction may be changed into the sixth light $L_{2c}$ that is polarized in the first direction by the second phase retarder 50.

The second polarization member 30 may pass therethrough only light that is polarized in the first direction, and thus, only the sixth light $L_{2c}$ may pass through the second polarization member 30. In embodiments, the user who is in front of the second polarization member 30 may perceive only the sixth light $L_{2c}$ that originates from the second light $L_{2a}$ from among the light emitted from the display panel 100 in the slanted direction.

The light emitted from the display panel 100 in the slanted direction may be reflected by the reflection member 10 to change its path. Accordingly, it may look to the user as if light incident on the user is incident from a predetermined area VI. The area VI may be an area where any of pixels of the display panel 100 is not actually disposed, and the user visually perceives a virtual image instead of a real image.

Referring to FIGS. 2A and 2B, it may look to the user as if an image is formed from a panel having a shape different from a shape of the display panel 100, for example, a quadrangular shape, that actually forms the image.

Figure 3A:
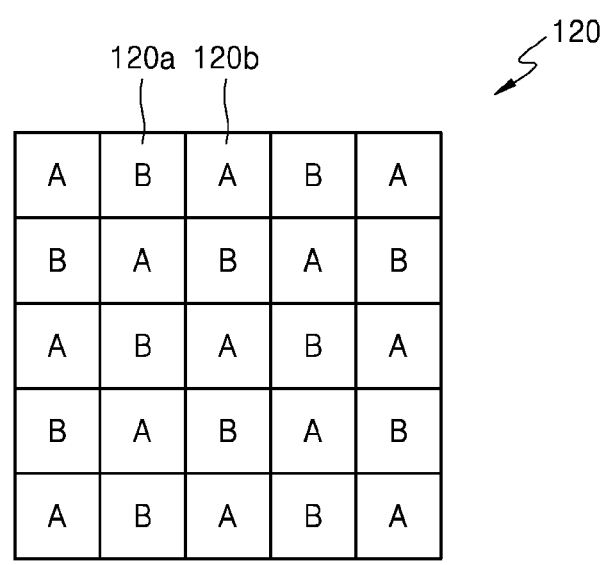
FIG. 3A is a view illustrating a first polarization member according to an embodiment.
Figure 3B:
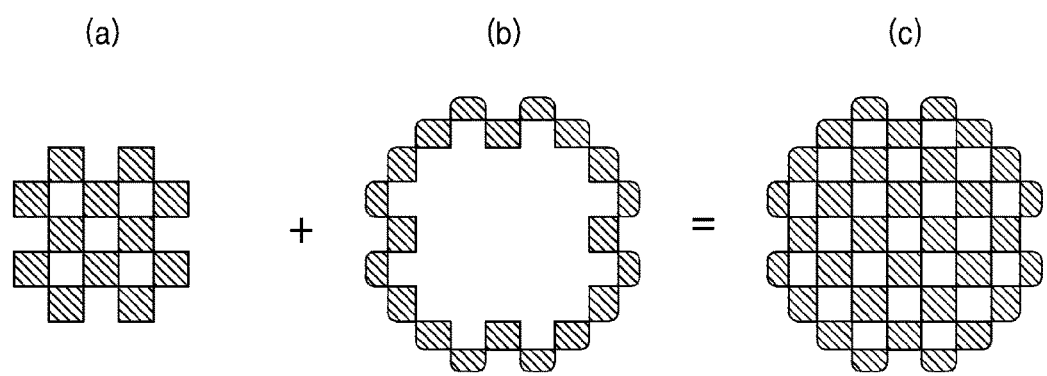
FIG. 3B is a result obtained after simulating an image visually perceived in a display apparatus including the first polarization member of FIG. 3A, according to an embodiment.

FIG. 3A is a view illustrating a first polarization member 120 according to an embodiment. FIG. 3B is a result obtained after simulating an image visually perceived in a display apparatus including the first polarization member 120 of FIG. 3A, according to an embodiment.

Referring to FIGS. 3A and 3B, the first polarization member 120 according to an embodiment may include a first area 120a that transmits therethrough only a component of a first direction and a second area 120b that transmits therethrough only a component of a second direction from among light emitted from the display panel 100 (see FIG. 1), and the first area 120a and the second area 120b may be arranged in a checkerboard pattern.

In embodiments, light emitted from the display panel 100 (see FIG. 1) in the normal direction and passing through the first areas 120a of the first polarization member 120 may be visually perceived by a user as shown in (a) of FIG. 3B. Light passing through the second areas 120b of the first polarization member 120 and reflected by the reflection member may be visually perceived by the user as shown in (b) of FIG. 3B. In embodiments, since only light reflected by the reflection member 10 (see FIG. 1) from among the light passing through the second areas 120b may be visually perceived by the user, it may look to the user as if a display panel that forms an image is located outside the display panel 100 (see FIG. 1). An image that is finally visually perceived by the user is shown in (c) of FIG. 3B, and it may look to the user as if an image is formed by a circular display panel.

Figure 4A:
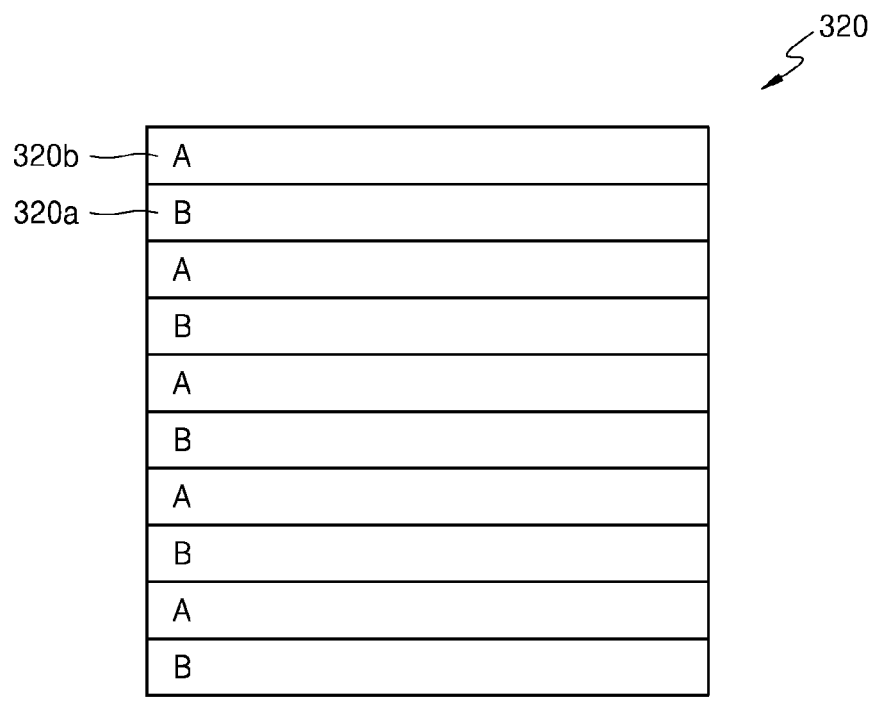
FIG. 4A is a view illustrating a first polarization member according to another embodiment.
Figure 4B:
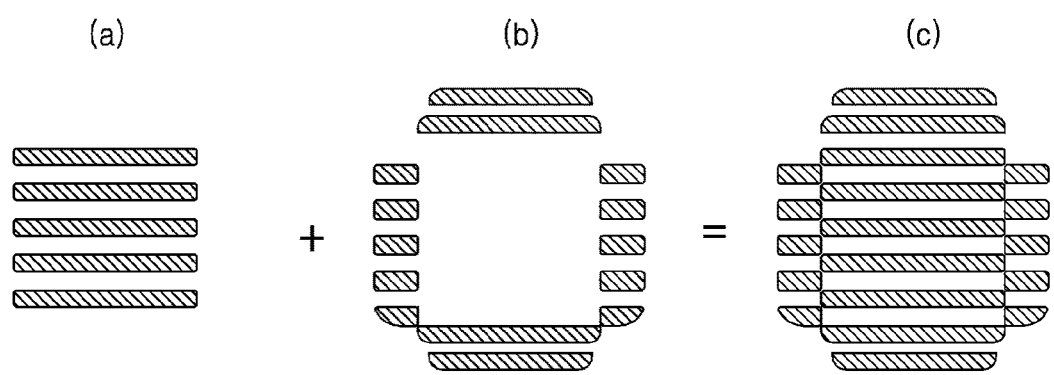
FIG. 4B is a result obtained after simulating an image visually perceived in a display apparatus including the first polarization member of FIG. 4A, according to an embodiment.

FIG. 4A is a view illustrating a first polarization member 320 according to another embodiment. FIG. 4B is a result obtained after simulating an image visually perceived in a display apparatus including the first polarization member 320 of FIG. 4A, according to an embodiment.

Referring to FIGS. 4A and 4B, the first polarization member 320 according to an embodiment may include a first area 320a that transmits therethrough only a component of a first direction and a second area 320b that transmits therethrough only a component of a second direction from among light emitted from the display panel 100 (see FIG. 1), and the first area 320a and the second area 320b may be alternately arranged in a striped pattern.

In the illustrated embodiments, light emitted from the display panel 100 (see FIG. 1) and passing through the first area 320a of the first polarization member 320 may be visually perceived as shown in (a) of FIG. 4B. Light passing through the second area 320b of the first polarization member 320 may be visually perceived as shown in (b) of FIG. 4B. In embodiments, since only light reflected by the reflection member 10 (see FIG. 1) from among the light passing through the second area 320b may be visually perceived by a user, it may look to the user as if a display panel that forms an image is located outside the display panel 100 (see FIG. 1). An image that is finally visually perceived by the user is shown in (c) of FIG. 4B, and it may look to the user as if an image is formed from a display panel having a shape as shown in (c) of FIG. 4B.

Figure 5:
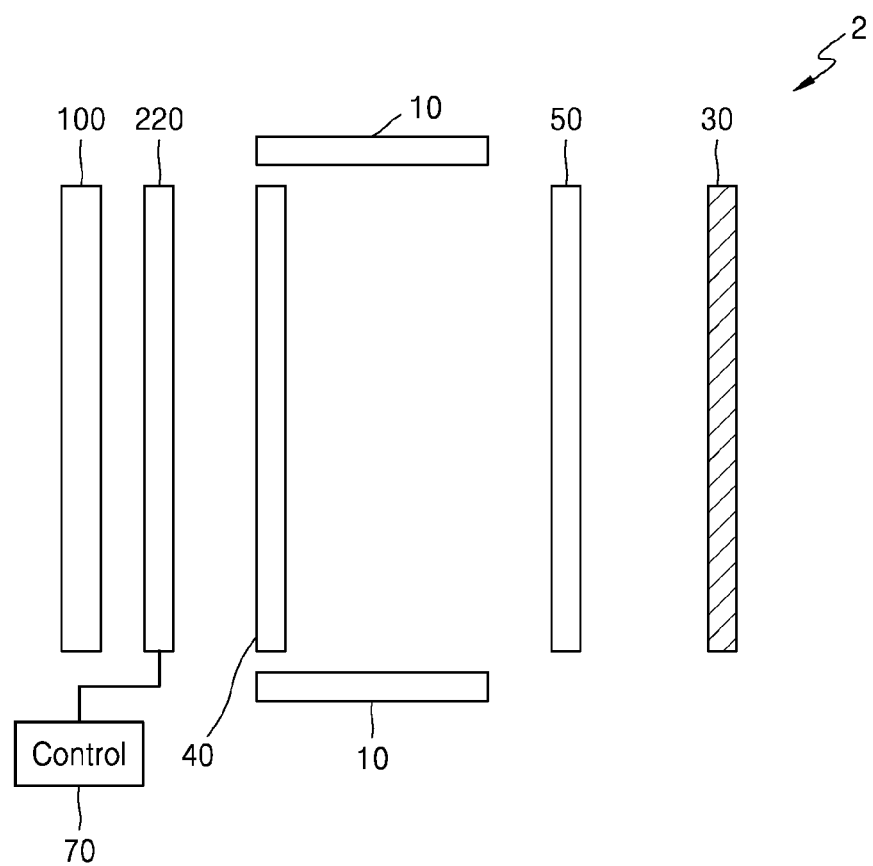
FIG. 5 is a view illustrating a display apparatus according to another embodiment.

FIG. 5 is a view illustrating a display apparatus 2 according to another embodiment.

Referring to FIG. 5, there is only a difference in a configuration of a first polarization member 220 between the display apparatus 2 and the display apparatus 1 of FIG. 1, and the following explanation will focus on the difference.

The display apparatus 2 according to an embodiment includes the display panel 100, the first polarization member 220 that is disposed in front of the display panel 100 and separates light emitted from the display panel 100 into first light and second light that are respectively polarized in a first direction and a second direction that are substantially perpendicular to each other, the second polarization member 30 that is disposed in paths of the first light and the second light that pass through the first polarization member 220 and transmits therethrough only light that is polarized in the first direction, the reflection member 10 that is disposed in a path of light emitted from the display panel 100 in a slanted direction with an angle that is greater than a predetermined value with respect to a normal direction and reflects light that is incident from the display panel 100 to the second polarization member 30, the first phase retarder 40 that is disposed in a path of light that is emitted from the display panel 100 and is incident on the reflection member 10, and the second phase retarder 50 that is disposed in a path of light that is reflected by the reflection member 10 and is incident on the second polarization member 30.

The first polarization member 220 may separate the light emitted from the display panel 100 into the first light and the second light that are temporally respectively polarized in the first direction and the second direction. Although the first polarization member 220 is not spatially divided into the first area 20a and the second area 20b, unlike the first polarization member 20 of FIG. 1, as time passes, the first polarization member 220 may pass therethrough only the first light that is polarized in the first direction or may pass therethrough only the second light that is polarized in the second direction.

In embodiments, the first polarization member 220 may have a switching function of transmitting therethrough only a component of the first direction or transmitting only a component of the second direction, and the switching function may be controlled by a controller 70. For example, the first polarization member 220 may be controlled according to an electrical signal, and may include an anisotropic material such as liquid crystals.

When the first polarization member 220 transmits therethrough only a component of the first direction, a shape of the display panel 100 and a shape visually perceived by a user may be the same. When the first polarization member 220 transmits therethrough only a component of the second direction, since the user perceives only light reflected by the reflection member 10, it may look to the user as if an image is displayed from the outside of the display panel 100.

When the switching time is reduced to be less than a predetermined value, it may look to the user as if light that reaches the user without being reflected by the reflection member 10 and light that reaches the user after being reflected by the reflection member 10 are simultaneously visually perceived. In embodiments, it may look to the user as if an image is displayed from a panel having a shape other than the shape, e.g., a quadrangular shape, of the display panel 100.

Figure 6:
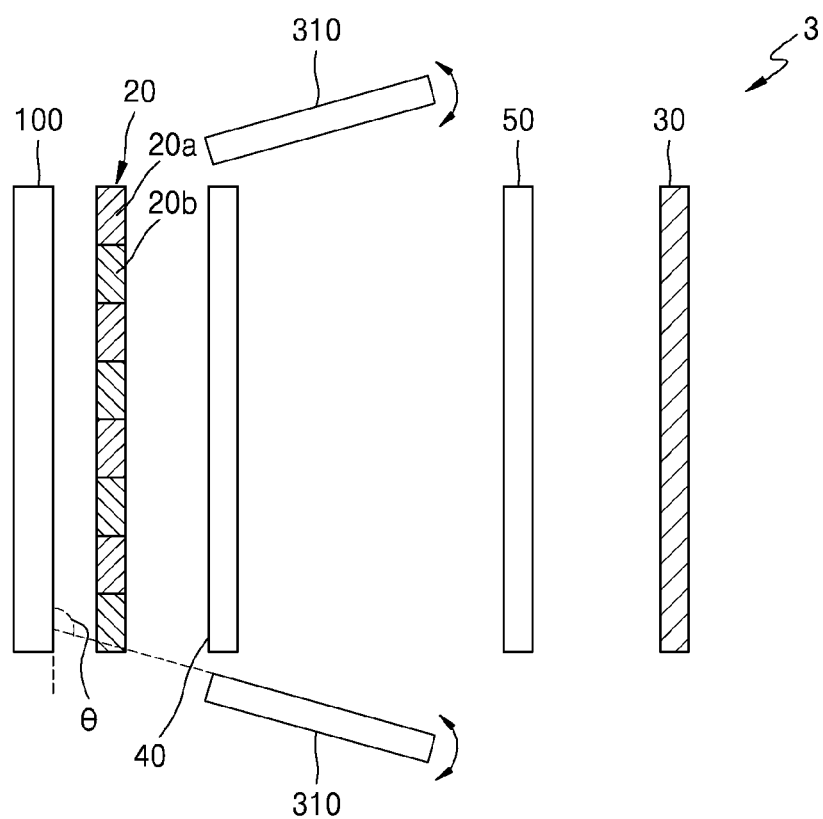
FIG. 6 is a view illustrating a display apparatus according to another embodiment.

FIG. 6 is a view illustrating a display apparatus 3 according to another embodiment.

Referring to FIG. 6, there is only a difference in a configuration of a reflection member 310 between the display apparatus 3 and the display apparatus 1 of FIG. 1. The following explanation will focus on the difference.

The display apparatus 3 according to an embodiment includes the display panel 100, the first polarization member 20 that is disposed in front of the display panel 100 and separates light emitted from the display panel 100 into first light and second light that are respectively polarized in a first direction and a second direction that are substantially perpendicular to each other, the second polarization member 30 that is disposed in paths of the first light and the second light that pass through the first polarization member 20 and transmits therethrough only light that is polarized in the first direction, the reflection member 310 that is disposed in a path of light emitted from the display panel 100 in a slanted direction with an angle that is greater than a predetermined value with respect to a normal direction and reflects light that is incident from the display panel 100 to the second polarization member 30, the first phase retarder 40 that is disposed in a path of light that is emitted from the display panel 100 and is incident on the reflection member 10, and the second phase retarder 50 that is disposed in a path of light that is reflected by the reflection member 10 and is incident on the second polarization member 30.

As described above, part of the light emitted from the display panel 100 in the slanted direction may be reflected by the reflection member 310 and then may pass through the second phase retarder 50 and the second polarization member 30.

An angle θ between a light-emission surface of the display panel 100 and a reflective surface of the reflection member 310 may be equal to or greater than about 90°, and an angle of light that passes through the second polarization member 30 and is incident on a user may vary according to the angle θ. As a result, the shape of a display panel visually perceived by the user may vary according to the angle θ.

The display apparatus 3 according to an embodiment may adjust the angle θ between the light-emission surface of the display panel 100 and the reflective surface of the reflection member 310. In detail, a gradient of the reflection member 310 may be adjusted.

According to an embodiment, since the angle θ may be adjusted, a shape of a display panel visually perceived by the user may also be adjusted.

As described above, according to the one or more of the above embodiments, a display apparatus can display an image having a shape different from that of an array of pixels of the display panel. For example, a display apparatus can display a circular or oval shaped image using a display panel having a square or rectangular shaped array of pixels. Thus, a pseudo-free form display apparatus has an actual shape that is relatively easily manufactured and a visually perceived shape that is different from the actual shape. The scope of the inventive concept is not limited by the effect.

It should be understood that the embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:
   a display panel comprising a major surface, the display panel comprising an array of pixels;
   a first polarization member that is disposed over the display panel, and configured to separate light output from the major surface of the display panel into first polarized light and second polarized light that are respectively polarized in a first direction and a second direction that are substantially perpendicular to each other;
   a second polarization member that is disposed over the first polarization member such that the first polarization member is disposed between the display panel and the second polarization member, the second polarization member being configured to allow light polarized in the first direction to transmit therethrough and inhibit light polarized in the second direction from transmitting therethrough;
   a reflection member that is disposed in a position not to overlap any portion of the array when viewed in a normal direction substantially perpendicular to the major surface, the reflection member having a reflective surface and being configured to reflect light, via the reflective surface, output from the display panel in a direction slanted with respect to the normal direction and transmitted through the first polarization member toward the second polarization member;
   a first phase retarder that is disposed in a path of light that is output from the display panel and transmitted through the first polarization member toward the reflection member; and
   a second phase retarder that is disposed in a path of light that is reflected by the reflection member and transmitted toward the second polarization member,
   wherein the reflective surface of the reflection member is substantially perpendicular to or crosses the major surface of the display panel.

2. The display apparatus of claim 1, wherein the display panel has a substantially quadrangular shape.

3. The display apparatus of claim 1, wherein each of the first phase retarder and the second phase retarder is a quarter wave plate, wherein there is an angle of about 45° between a slow axis of the first phase retarder and an axis of polarization of the first polarization member, wherein there is an angle of about 90° between a slow axis of the second phase retarder and the slow axis of the first phase retarder.

4. The display apparatus of claim 1, wherein the first polarization member comprises a plurality of first areas configured to transmit therethrough only a component of the first direction of light emitted from the display panel and a plurality of second areas configured to transmit therethrough only a component of the second direction of the light emitted from the display panel.

5. The display apparatus of claim 4, wherein the plurality of first areas and the plurality of second areas are arranged in a checkerboard pattern.

6. The display apparatus of claim 4, wherein the plurality of first areas being stripe-shaped and the plurality of second areas being stripe-shaped are alternately arranged.

7. The display apparatus of claim 1, wherein the first polarization member is configured to switch between transmitting therethrough only a component of the first direction of the light emitted from the display panel and transmitting therethrough only a component of the second direction of the light emitted from the display panel according to an electrical signal.

8. The display apparatus of claim 1, wherein an angle between a light-emission surface of the display panel and a reflective surface of the reflection member is equal to or greater than about 90°.

9. The display apparatus of claim 1, wherein the major surface comprises a light-emission surface, and wherein an angle between the light-emission surface of the display panel and the reflective surface of the reflection member is adjustable.

10. The display apparatus of claim 1, wherein the reflection member surrounds the display panel when viewed in the normal direction and is disposed not to reflect light that is emitted from the display panel in the normal direction.

11. The display apparatus of claim 1, wherein the reflection member does not overlap the display panel when viewed in the normal direction substantially perpendicular to the major surface of the display panel.

12. The display apparatus of claim 1, wherein each of the first and second polarization members and the first and second phase retarders has a major surface, and wherein the reflection member is substantially perpendicular to the major surfaces of the first and second polarization members and the major surfaces of the first and second phase retarders.

13. The display apparatus of claim 1, wherein the reflection member is configured to reflect light that is emitted from the display panel and passes through the first polarization member and the first phase retarder toward the second phase retarder and the second polarization member such that the reflected light passes through the second phase retarder and the second polarization member.

14. A display apparatus comprising:
a display panel comprising an array of pixels, the array having a quadrangular shape; and
a reflection member that is disposed in a place not to overlap any portion of the array when viewed in a normal direction substantially perpendicular to a major surface of the display panel, the reflection member having a reflective surface and being configured to reflect light, via the reflective surface, that is output from the display panel in a direction slanted with respect to the normal direction,
wherein combination of light output from the major surface of the display panel in the normal direction and the reflected light is configured to form an image having a shape other than a quadrangular shape,
wherein the reflective surface of the reflection member is substantially perpendicular to or crosses the major surface of the display panel.

15. The display apparatus of claim 11, further comprising:
a first polarization member that is disposed over the display panel, and configured to separate light emitted from the display panel into first polarized light and second polarized light that are respectively polarized in a first direction and a second direction that are substantially perpendicular to each other;
a second polarization member that is disposed over the first polarization member such that the first polarization member is disposed between the display panel and the second polarization member, the second polarization member being configured to allow light polarized in the first direction to transmit therethrough and inhibit light polarized in the second direction from transmitting therethrough;
a first phase retarder that is disposed in a path of light that is emitted from the display panel and is incident on the reflection member; and
a second phase retarder that is disposed in a path of light that is reflected by the reflection member and is incident on the second polarization member.

16. The display apparatus of claim 15, wherein each of the first phase retarder and the second phase retarder is a quarter wave plate, wherein there is an angle of about 45° between a slow axis of the first phase retarder and an axis of polarization of the first polarization member, wherein there is an angle of about 90° between a slow axis of the second phase retarder and the slow axis of the first phase retarder.

17. The display apparatus of claim 15, wherein the first polarization member comprises a plurality of first areas configured to transmit therethrough only a component of the first direction of light emitted from the display panel and a plurality of second areas configured to transmit therethrough only a component of the second direction of the light that is emitted from the display panel.

18. The display apparatus of claim 17, wherein the plurality of first areas and the plurality of second areas are arranged in a checkerboard pattern.

19. The display apparatus of claim 17, wherein the plurality of first areas being stripe-shaped and the plurality of second areas being stripe-shaped are alternately arranged.

20. The display apparatus of claim 15, wherein the first polarization member is configured to switch between transmitting therethrough only a component of the first direction of the light emitted from the display panel and transmitting therethrough only a component of the second direction from among the light that is emitted from the display panel according to an electrical signal.

21. The display apparatus of claim 14, wherein an angle between a light-emission surface of the display panel and a reflective surface of the reflection member is equal to or greater than about 90°.

22. The display apparatus of claim 14, wherein an angle between a light-emission surface of the display panel and a reflective surface of the reflection member is adjustable.

23. The display apparatus of claim 14, wherein the reflection member surrounds the display panel when viewed in the normal direction and is disposed not to reflect light that is emitted from the display panel in the normal direction.

* * * * *